July 18, 1933.   H. B. NEWTON ET AL   1,918,349
LAWN MOWER
Filed Sept. 8, 1932
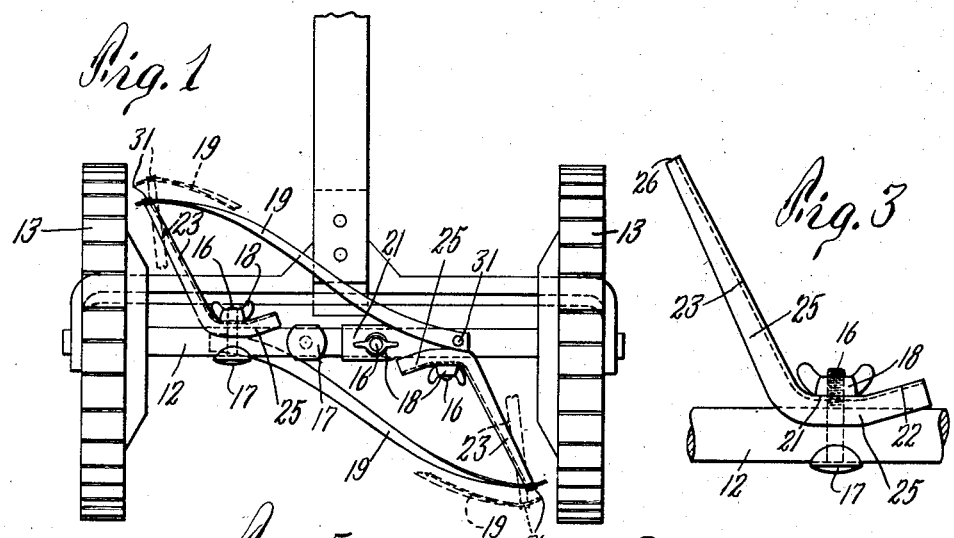
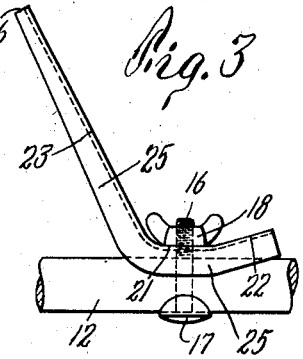
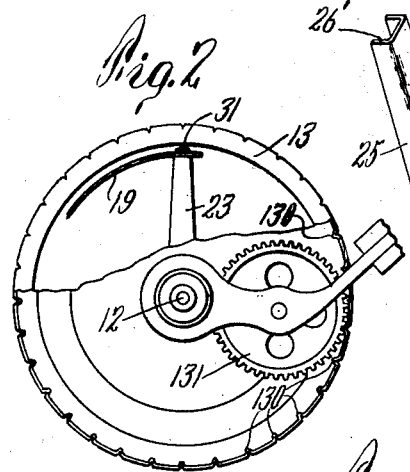
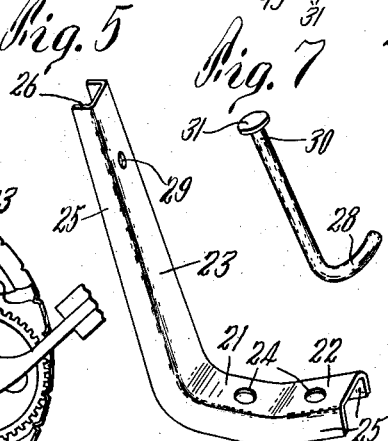
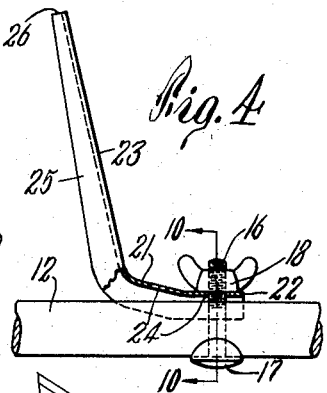
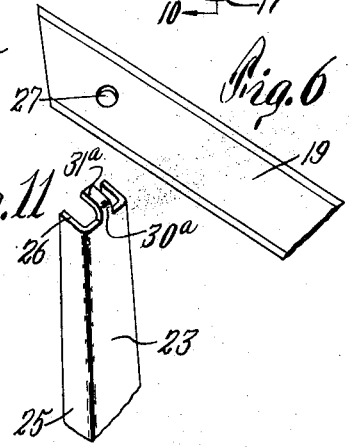
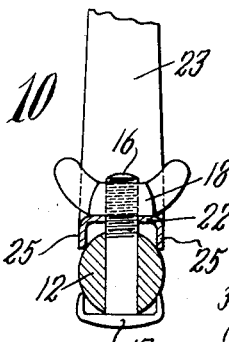
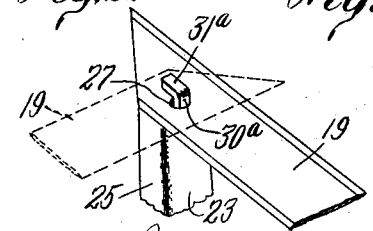
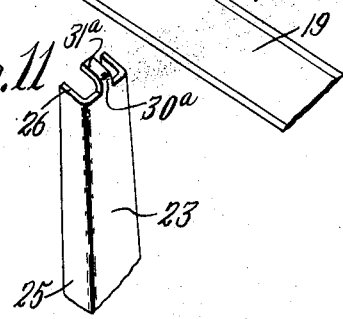
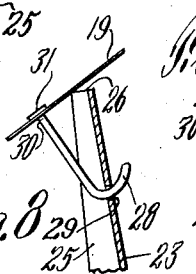
Inventors
Herbert B. Newton
Thomas C. Newton Patented July 18, 1933

1,918,349

UNITED STATES PATENT OFFICE

HERBERT B. NEWTON AND THOMAS C. NEWTON, OF BROOKLINE, MASSACHUSETTS, ASSIGNORS TO AUTO SICKLE COMPANY, OF BOSTON, MASSACHUSETTS, A CORPORATION OF MASSACHUSETTS

LAWN MOWER

Application filed September 8, 1932. Serial No. 632,158.

This invention relates to a lawn mower which includes an axle supported by traction wheels and driven by mechanism which includes said wheels, and resilient cutting blades supported in spiral form by spider arms releasably attached to the axle, and revolved by the rotation thereof to cut grass, said blades constituting the only cutting element of the mower and being detachably connected with the arms.

A mower characterized as above stated is shown by Letters Patent of the United States to Herbert B. Newton No. 1,623,433 dated April 5, 1927.

One object of the present invention is to provide certain improvements in the blade supporting arms whereby the blades when supported in spiral form by said arms may be located at different distances from the axle to enable the mower to cut grass at different distances from the ground, and thus vary the height of the grass left standing by the mower. Another object is to provide improved means for detachably connecting the blades with the arms to prevent liability of injury to the blades in connecting them with and detaching them from the arms.

Of the accompanying drawing forming a part of this specification,—

Figure 1 is a front view of a mower embodying our improvements.

Figure 2 is an end view of the same, a portion of one of the traction wheels being broken away.

Figure 3 is a fragmentary view showing a portion of the axle and one of the improved arms attached thereto in one operative position.

Figure 4 is a view similar to Figure 3, showing the arm attached to the axle in another operative position.

Figure 5 is a perspective view of one of the arms.

Figure 6 is a fragmentary perspective view showing an end portion of one of the blades.

Figure 7 is a perspective view showing the preferred form of the keepers.

Figures 8 and 9 are fragmentary views each showing the keeper shown by Figure 7.

Figure 10 is a section on line 10—10 of Figure 4.

Figures 11 and 12 are fragmentary perspective views showing a modification.

The same reference characters indicate the same parts in all of the figures.

In the drawing, 12 designates an axle supported and adapted to be rotated by traction wheels 13, at opposite end portions of the axle, any suitable one-way driving mechanism being provided, organized to permit the axle to remain at rest when the mower is moving backward, and cause the rotation of the axle when the mower is moving forward. The traction wheels 13 have internal gear teeth 130 (Figure 2) meshing with the teeth of intermediate gears 131 which transmit one-way torque from the traction wheels of the axle.

As disclosed by the Newton patent, spider arms are releasably attached to the axle 12. Said arms include bases fitted to the axle, and releasably attached thereto by clamping means preferably including clamping bolts 16, having heads 17 and nuts 18. Each arm has an integral keeper at its outer end, adapted to engage an orifice in one end of a flexible blade 19. The arms project laterally from the axle, and are inclined relative thereto. The arms are arranged in pairs, one arm of each pair engaging one end of a blade, and being inclined in one direction. The other arm engages the opposite end of the blade, and is inclined in the opposite direction. The angularity or direction of projection of one arm differs from that of the other, so that the engagement of a resilient blade with both arms imparts a spiral curvature to the blade.

The spider arms shown by the above mentioned patent are provided with T-shaped keepers and the blade ends with keyhole shaped orifices which are engageable with said keepers by the various manipulations described by said patent.

It has been found that when the keepers and blade orifices are thus formed there is sometimes liability of breaking the end portions of the blades in engaging the orifices with, and disengaging them from, the keepers.

In carrying out the present invention we have had in view two general objects, viz, first, to provide means associated with the inner ends of the arms and with the axle for adjusting the spider arms relative to the axle in such manner as to permit variation of the distance between the spiralled blades and the axle, and thereby enable the mower to cut grass at different distances from the ground, and thus vary the height of the grass left standing by the mower, and second, to improve the form of the blade orifices and the arms and their keepers to prevent the above-mentioned liability of breakage.

Said objects are attained by the improved construction next described.

Each arm includes two base portions 21 and 22 and an inclined outer portion 23. The base portions 21 and 22 are inclined relative to each other and to the outer portion 23 as best shown by Figure 5. Each of said base portions is provided with a hole 24 formed to receive the bolt 16.

The arrangement is such that the inclination of the outer portion 23 of the arms relative to the axle may be varied to vary the distance of the spiralled blades from the axle by attaching different portions of the arm bases to the axle.

When the inner portions 21 of the bases are attached by the clamping means to the axle as shown by Figures 1 and 3, the outer arm portions 23 are inclined as shown by full lines in Figure 1, so that their outer ends and the blades engaged therewith, are at a minimum distance from the axle, and the mower is adapted to cut grass at a maximum distance from the ground. When the outer portions 22 of the bases are attached by said clamping means to the axle, the outer arm portions are differently inclined as shown by dotted lines in Figure 1, so that their outer ends and the blades engaged therewith are at a maximum distance from the axle, and the mower is adapted to cut grass at a minimum distance from the ground.

Provision is therefore made for adjusting the arms relative to the axle to vary the distance of the spiralled blades from the axle for the purpose stated.

The arms are preferably stamped from plate metal so that they include side flanges 25 and intermediate webs as best shown by Figure 5, the flanges 25 of the bases straddling the axle 12 as shown by Figure 10. The extremities of the flanges and webs at the outer ends of the arm portions 23 form substantially U-shaped seats 26 for the end portions of the blades.

In attaining the second object of the invention we provide improved means for engaging the blades with the arms in such manner as to obviate the above mentioned liability of breaking the blades during the operation of engaging them with and removing them from the arms.

The T-shaped keeper and the keyhole shaped blade orifices shown by the above mentioned Newton patent are so formed that when a blade is swung edgewise on a keeper, breakage of the blade is sometimes caused by interference between a portion of the margin of its keyhole shaped orifice, and a portion of the T shaped keeper.

To prevent such interference we provide the blade ends with orifices 27, (Figure 6) having uninterrupted circular margins, and construct each keeper so that it includes a pivot portion projecting outward from the blade seat 26, and extending through a circular blade orifice 27, and a confining portion bearing on the outer side of the blade, the arrangement being such that the blade is adapted to swing edgewise on the blade seat about the pivot portion without interference with any portion of the keeper.

The keeper is preferably a metal rod shown separately by Figure 7, the general form of the rod being similar to that of a rivet. Said keeper includes an anchoring portion 28 formed by bending the inner end portion of the rod and loosely engaging it with an orifice 29 (Figure 5), in the inclined arm portion 23, the keeper being adapted to swing toward and from the arm as shown by Figures 8 and 9.

The keeper includes also a pivot portion 30 which extends through a blade orifice 27, and a confining portion or head 31 bearing on the outer side of the blade.

The pivot portion 30 and the confining portion 31 are first engaged with the blade and the anchoring portion 28 is then engaged with the arm 23, the keeper being inclined outward from the arm as shown by Figure 8. The blade and keeper are then swung in unison to the operative positions shown by Figure 9. This operation causes the confining portion, or head 31, to press the blade against the blade seat 26, as shown by Figure 9, and at the same time permit the blade to swing edgewise about the pivot portion 30 without liability of interference with any portion of the keeper, and therefore without liability of breakage of the blade.

In the modification shown by Figures 11 and 12 the pivot portion and the confining portion of the keeper are integral with the arm portion 23.

The keeper is an angular finger including a pivot portion 30$^a$ projecting outward from the blade seat and through the blade orifice 27, and a confining portion 31$^a$ bearing on the outer side of the blade, the blade being adapted to swing edgewise on the blade seat about the pivot portion 30$^a$ without interference with any portion of the keeper. Said angular finger is formed to permit the blade to be moved thereon until its inner side bears on the blade seat.

We claim:

1. A lawn mower which includes a driven axle, spider arms having bases seated on the axle, clamping means releasably attaching said bases to the axle, the arms being arranged in pairs and including outer portions inclined from the bases and provided with keepers at their outer ends, and flexible blades having orifices in their end portions adapted to engage said keepers therewith, each pair of spider arms being arranged to cause a spiral formation of the blade engaged therewith, the mower being characterized by means associated with the inner ends of the arms and with the axle for adjusting the arms relative to the axle to vary the distance of the spiralled blades from the axle.

2. A lawn mower which includes a driven axle, spider arms having bases seated on the axle, clamping means releasably attaching said bases to the axle, the arms being arranged in pairs and including outer portions inclined from the bases and provided with keepers at their outer ends, and flexible blades having orifices in their end portions adapted to engage said keepers therewith, each pair associated with the inner ends of the arms and with the axle being arranged to cause a spiral formation of the blade engaged therewith, the mower being characterized by means for varying the inclination of the arms relative to the axle to vary the distance of the spiralled blades from the axle.

3. A lawn mower which includes a driven axle, spider arms having bases seated on the axle, clamping means releasably attaching said bases to the axle, the arms being arranged in pairs and including outer portions inclined from the bases and provided with keepers at their outer ends, and flexible blades having orifices in their end portions adapted to engage said keepers therewith, each pair of spider arms being arranged to cause a spiral formation of the blades engaged therewith, the mower being characterized by the fact that the base of each arm includes two portions each formed to be seated on the axle and attached thereto by said clamping means, said portions being inclined relative to each other and to the outer portion of the arm, the arrangement being such that the inclination of the outer portions of the arms relative to the axle may be varied to vary the radial distance of the blades from the axle, by attaching different portions of said bases to the axle.

4. A lawn mower which includes a driven axle, spider arms having bases seated on the axle, clamping means releasably attaching said bases to the axle, the arms being arranged in pairs and including outer portions inclined from the bases and provided with blade seats and blade keepers at their outer ends, and flexible blades having uninterrupted circular orifices in their end portions whereby the blades are adapted to be engaged with the keepers, each pair of spider arms being arranged to cause a spiral formation of the blade engaged therewith, each keeper including a pivot portion projecting outward from the blade seat and extending through one of the circular blade orifices, and a confining portion bearing on the other side of the blade, the arrangement being such that the blade is adapted to swing edgewise on the blade seat about the pivot portion without interference with any portion of the keeper.

5. A lawn mower which includes a driven axle, spider arms having bases seated on the axle, clamping means releasably attaching said bases to the axle, the arms being arranged in pairs and including outer portions inclined from the bases and provided with blade seats and blade keepers at their outer ends, and flexible blades having uninterrupted circular orifices in their end portions whereby the blades are adapted to be engaged by the keepers, each pair of spider arms being arranged to cause a spiral formation of the blade engaged therewith, each keeper being a rod including an anchoring portion loosely engaging an arm orifice so that the keeper is adapted to swing toward and from the arm, a pivot portion extending through one of the circular blade orifices, and a confining portion bearing on the outer side of the blade, the keeper and blade being adapted to swing in unison to locate the blade on the blade seat, the arrangement being such that when the blade bears on the seat the confining portion presses the blade against the seat, and permits the blade to swing edgewise about the pivot portion without liability of interference with any portion of the keeper.

HERBERT B. NEWTON.
THOMAS C. NEWTON.